United States Patent
Sherzer

(10) Patent No.: US 8,419,925 B2
(45) Date of Patent: Apr. 16, 2013

(54) METHOD FOR ELECTRODE RENEWAL

(76) Inventor: David Sherzer, Omer (IL)

( * ) Notice: Subject to any disclaimer, the term of this patent is extended or adjusted under 35 U.S.C. 154(b) by 885 days.

(21) Appl. No.: 12/193,057

(22) Filed: Aug. 18, 2008

(65) Prior Publication Data

US 2010/0038260 A1  Feb. 18, 2010

(51) Int. Cl.
*C25F 1/02* (2006.01)
*B01D 59/40* (2006.01)
*C02F 1/461* (2006.01)

(52) U.S. Cl.
USPC ........... 205/710; 205/705; 205/711; 205/729; 205/742; 205/744

(58) Field of Classification Search .................. 205/705, 205/710–711, 729, 742, 744
See application file for complete search history.

(56) References Cited

U.S. PATENT DOCUMENTS

| | | | | |
|---|---|---|---|---|
| 2,165,326 A * | 7/1939 | Yerger et al. | ................ | 204/211 |
| 4,201,650 A * | 5/1980 | Nagano et al. | ................ | 204/209 |
| 4,276,133 A * | 6/1981 | Nagano et al. | ................ | 205/712 |
| 4,306,952 A * | 12/1981 | Jansen | ........................... | 205/744 |
| 5,210,496 A * | 5/1993 | Hafner | ........................... | 324/439 |
| 5,317,159 A * | 5/1994 | Fukushima et al. | ........... | 250/381 |
| 5,439,566 A * | 8/1995 | Zucker | ........................... | 205/744 |
| 5,543,040 A * | 8/1996 | Fite et al. | ................. | 210/167.01 |
| 5,985,673 A * | 11/1999 | Bao et al. | ...................... | 436/151 |
| 6,143,163 A * | 11/2000 | Sawamoto et al. | ........... | 205/742 |
| 6,620,305 B2 * | 9/2003 | Cornell et al. | ................. | 205/413 |
| 6,758,960 B1 * | 7/2004 | Robertson | ..................... | 205/775 |
| 2008/0029124 A1* | 2/2008 | Schroeder | ......................... | 134/1 |
| 2009/0211918 A1* | 8/2009 | Hardee | ......................... | 205/556 |

* cited by examiner

*Primary Examiner* — Arlen Soderquist

(57) ABSTRACT

A method for electrode renewal, for use in an electrolytic processing chamber for a liquid therein wherein the processing includes, for a pair of electrodes in the chamber, placing a positive voltage on one electrode in the chamber and placing a like negative voltage on another electrode in the chamber. It has been common practice to reverse the voltage between these electrodes in order to re-dissolve the buildup thereon. Now, the present inventor has observed that a voltage passing through or across an electrode will cause some minor cavitations on the electrode surface between the contact junctures of the voltage, and apparently the cavitations results in the buildup there-on detaching in bulk; which is much faster than the heretofore known re-dissolve processes of electrode renewal.

14 Claims, 2 Drawing Sheets

Operational State (I)

Renewal State (II)

Renewed State (III)

Operational State (I)

Renewal State (II)

Renewed State (III)

METHOD FOR ELECTRODE RENEWAL

FIELD OF THE INVENTION

The instant invention generally relates to renewal of electrodes and specifically relates to renewal of electrodes that are used in electrolytic processes in fluid environments.

BACKGROUND OF THE INVENTION

Today, there are numerous industrial processes wherein electric potential (voltage) is passed through a fluid.

For example, there are water treatment systems that include the water passing through a cell having a positive electrode (anode) and effectively a negative electrode (cathode), generally (for water processing) the cell or piping. In such systems, there is generally a mineral accumulation on the cathode, which progressively degrades the productivity of the unit, until it becomes necessary to renew the cathode by removing the built-up minerals that have accumulated on it or by replacing the cathode with a new electrode. Ether option is expensive. Replacing the electrode involves the cost of the new electrode, the system down time, and the scheduling of a skilled maintenance technician. Renewing the electrode involves reversing the potential between the two electrodes until the minerals plated re-dissolve back into the current fluid; which is subsequently discarded. Reversal of the electric potential has additional detrimental effects, beyond the system down time that is generally longer than that needed for electrode replacement. For example, during the voltage reversal there is mineral buildup on the piping and corrosion too.

Cells used for processing fluids including water generally involve electrode renewal by replacement or by voltage reversal; with substantially the same detriments as in the water based processes, except that the mineral buildup and corrosion during the reversal are essentially mitigated.

There is a long-felt need in the art for a better method for electrode renewal, such as one that is faster or one that has fewer detrimental effects.

NOTE

For the sake of simplicity in teaching the instant invention, the nomenclature "a pair of electrodes" is used. Now, it should readily be appreciated by the man-of-the-art that conceptually a pair is an anode and a cathode. More precisely, that the pair included two conductors having a voltage differential there-between. Nevertheless each electrode may appear to be a topological set of conductive elements whose temporal unity arises through their electrical interconnection—be that direct or via a control circuit or the likes. Furthermore, the control circuit may dynamically manage grouping of anodes or of cathodes, and "pairing" between these individual or grouped conductors—be they anodes or cathodes. Therefore, the reader should appreciate that the inventor is cognizant of multi-electrode sets and their use in electrolytic processes, and that the inventor elected nomenclature "pair" may be disclosed in the decomposition of more complex electrolytic arrangements than those that are hereinafter described and illustrated—for the purpose of conveying the "pith and marrow" of the instant invention. Simply stated then, a pair is two items or sets of items that are physically or logically selected from a set of at least two items.

SUMMARY OF THE INVENTION

The instant invention substantially relates to embodiments of a method for electrode renewal, for use in an electrolytic processing chamber for a liquid therein wherein the processing includes, for a pair of electrodes in the chamber, placing a positive voltage on one electrode in the chamber and placing a like negative voltage on another electrode in the chamber, and the method includes the steps of:

for a first electrode of the pair of electrodes having at least two conductive junctures thereon wherein one of said junctures is functioning during the electrolytic process on the electrode by virtue of being connected at the juncture to a source of voltage and wherein there is a buildup of electroplated products at least on a portion of the first electrode, (A) substantially disconnecting a second electrode of the pair of electrodes from a complementary source of voltage—since there may be reason to maintain a minor voltage on this electrode to prevent buildup or deterioration during the renewal or (as described below) there may be a simultaneous renewal of this electrode;

(B) at another of said junctures, connecting the first electrode to the complementary source of voltage—and these junctures are preferably prepositions and pre-attached to conductors to facilitate instant automatic renewal; and (C) on the first electrode, maintaining electro-connectivity to the voltage and complementary voltage substantially until a substantially predetermined portion of said buildup is released into the liquid.

While it has been common practice to reverse the voltage between the electrodes in order to re-dissolve the buildup thereon, the present inventor has observed that a voltage passing through or across an electrode will cause some minor cavitations on the electrode surface between the contact junctures of the voltage, and apparently the cavitations results in the buildup there-on detaching in bulk; which is much faster than the heretofore known re-dissolve processes of renewal.

In instances where the liquid is water, applications of the instant invention include cold water systems such as commercial cooling, hot water system such as boilers and central heating systems, potable water purification such as for drinking water such in conjunction with reverse osmosis, industrial process water treatment, water recycling, and the likes.

Looking at FIG. 4, in a typical industrial electrolytic processing chamber, there is a vertical axis substantially cylindrical container 401 having liquid therein, wherein a vertical axis positioned electrode 402 is suspended central to a majority of the upper cylinder. Generally, this vertical electrode is connected to a positive voltage 403 while generally a lower portion of the container wall or a portion thereof is connected to a negative voltage 404. Now, in the processing of "hard water" there will accumulate a buildup 405 of calcium carbonate and similar minerals onto the interior walls of the container. The inventor has observed that this buildup may generally be detached from the walls by disconnecting the positive voltage from the suspended electrode and reconnecting it to an upper portion of the container wall or a portion thereof.

Furthermore, the inventor has observed that running the operating voltage through the container wall will subjectively produce two results. In the first about 20 minutes of trans-container voltage, there is an apparent cavitations of the mineral buildup. By conjecture, it may be that the mineral buildup is not really homogeneous at the microscopic level—and therefore tiny regions of damp entrapped electrolyte in the mineral buildup expand or disassociate during the application of voltage to the container walls. As this apparent dissociation continues, micro cracks form in the buildup. Then in the next about 15 minutes of application of voltage to the container wall, the micro cracks expand—perhaps with the influx of fluid from the water filled container, and this influx combined with the continued effects of the container wall voltage cause the micro cracks to expand and combine—thereby causing chunks of the mineral buildup to break off.

In addition, it should be noted that that running the operating voltage through the container wall (according to some embodiments of the instant invention) is preferably done while there is the standard operating liquid of the container therein. Alternative embodiments relate to the running the operating voltage through the encrusted electrode (or the container wall) while the electrode is still damp from the operating liquid. Nevertheless, according to a further embodiment, the encrusted electrode may be substantially dry. Furthermore, various electrolytic, solvent, and surfactant enriched solutions are contemplated for the renewal of the encrusted electrode (or the container wall)—be these solutions in the original operating system or be they in a special electrode renewal chamber.

BRIEF DESCRIPTION OF THE FIGURES

A more complete understanding of the present invention and the advantages thereof may be acquired by referring to the following description in consideration of the accompanying drawings, in which like reference numbers indicate like features and wherein.

DETAILED DESCRIPTION OF THE INVENTION

Figure 1:
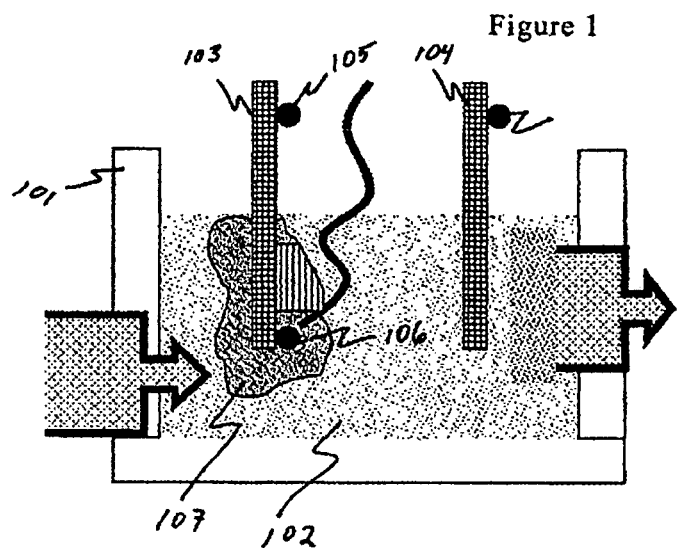
FIG. 1 shows a schematic view of the method for electrode renewal of the present invention.
Figure 1:
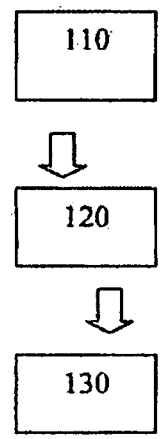
Figure 2:
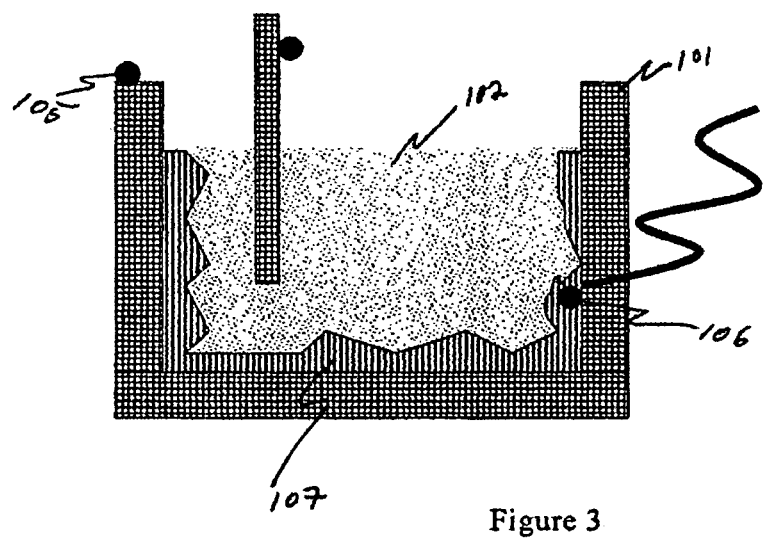
FIG. 2 shows a schematic view of stages of an apparatus operating according to the method for electrode renewal of the present invention.

Turning to FIG. 1, the instant invention relates embodiments of a method for electrode renewal, for use in an electrolytic processing chamber (101) for a liquid (102) therein wherein the processing includes, for a pair of electrodes (103, 104) in the chamber, placing a positive voltage on one electrode in the chamber and placing a like negative voltage on another electrode in the chamber, and the method includes the steps of: for a first electrode of the pair of electrodes having at least two conductive junctures thereon (105, 106) wherein one of said junctures (105) is functioning during the electrolytic process on the electrode by virtue of being connected at the juncture to a source of voltage and wherein there is a buildup of electroplated products (107) at least on a portion of the first electrode, (A) substantially disconnecting (110) a second electrode of the pair of electrodes from a complementary source of voltage; (B) at another of said junctures, connecting (120) the first electrode to the complementary source of voltage; and (C) on the first electrode, maintaining (130) electro-connectivity to the voltage and complementary voltage substantially until a substantially predetermined portion of said buildup is released into the liquid Turning to FIG. 2, there is an operational phase of the electrolytic cell wherein, for the example of hard water in the cell, chlorine gas forms on the positive electrode and calcium carbonate (scale) accumulates on the negative electrode. Thereafter, there is a renewal phase of the electrolytic cell wherein voltage to the positive electrode is disconnected so that it can be applied between the original contact point of the negative electrode and a location on the negative electrode distant from the contact point. Application of the voltage differential across the scale coated electrode results in apparent cavitations of the adhesion between the scale and the electrode which in turn causes the scale either to detach from the electrode into the adjacent water or to dissolve back into the adjacent water. At this stage the scale water may be flushed from the cell and the cell is now renewed and ready for another operational phase, etc.

According to one aspect of the instant invention, connecting the first electrode to the complimentary source of voltage includes selecting the another said juncture on the first electrode to be substantially on an opposite side of the buildup portion with respect to the juncture that is functioning during the electrolytic process—so as to facilitate a maximum effective cavitation region between the juncture of the voltage and of the complementary voltage.

According to another aspect of the instant invention, maintaining electro-connectivity includes releasing a cleaning substance into the liquid. The cleaning substance may be for acceleration of breakup of the detaching bulk, scale, etc. The cleaning substance may also be for further refurbishing of the electrode surface.

According to a further aspect of the instant invention, the electrolytic process liquid is brackish water, sewage, industrial process water, cooling water, re-circulated water, or the likes. In this context it is generally only on the cathode that needs to be renewed.

According to another further aspect of the instant invention, the electrolytic process liquid is petroleum based. In this context the renewal may be performed in parallel on all of the electrodes.

According to yet a different aspect of the instant invention, during maintaining electro-connectivity to the voltage and complementary voltage, the maintaining includes the electrolytic process voltage & complement being each DC and the voltage is selected from the list positive and negative and the complement is the voltage not selected from the list. Alternatively, according to a final aspect of the instant invention, during maintaining electro-connectivity to the voltage and complementary voltage, the maintaining includes the electrolytic process voltage & complement respectively AC—which for many application facilitates substantially equivalent surface cavitations effects.

Figure 3:
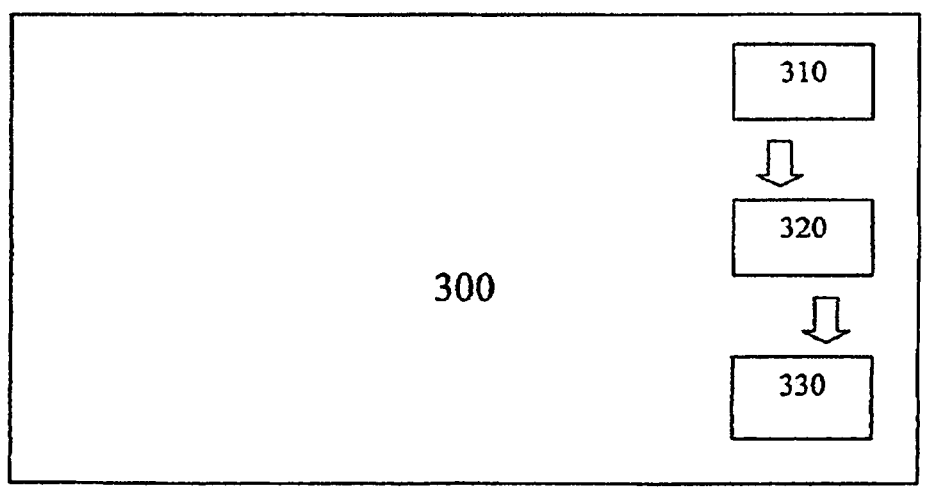
FIG. 3 shows a schematic view of an article of manufacture according to the method for electrode renewal of the present invention.
Figure 4:
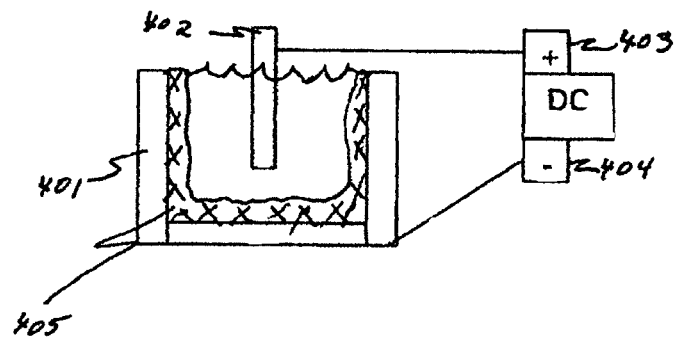
FIG. 4 shows a schematic view of typical before, during, and after states for electrode renewal according to a preferred embodiment of the present invention.
Figure 4:
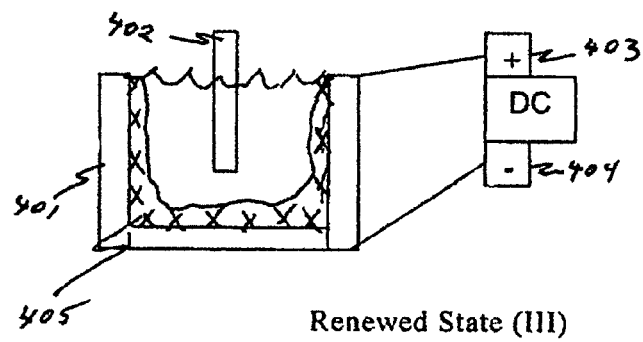
Figure 4:
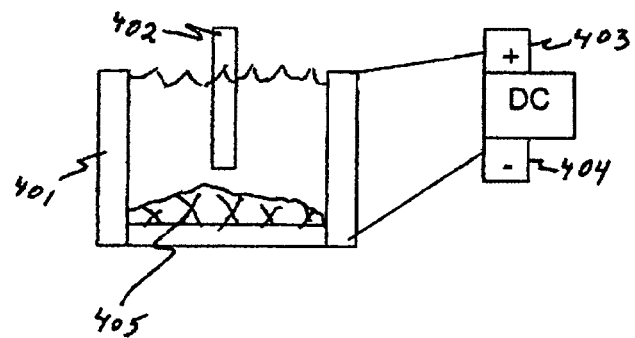

Turning to FIG. 3, the instant invention also relates embodiments of an article of manufacture (300) including a computer usable medium having computer readable program code embodied therein for facilitating an automatic controller for electrode renewal having associated therewith a first electrode of a pair of electrodes having at least two conductive junctures thereon wherein one of said junctures is functioning during an electrolytic process on the electrode by virtue of being connected at the juncture to a source of voltage and wherein there is a buildup of electroplated products at least on a portion of the first electrode, the computer readable program code in said article of manufacture including: first computer readable program code (310) for causing the computer to substantially disconnect a second electrode of the pair of electrodes from a complementary source of voltage; second computer readable program code (320) for causing the computer to connect the first electrode to the complementary source of voltage at another of said junctures; and third computer readable program code (330) for causing the computer to maintain electro-connectivity, on the first electrode, to the voltage and complementary voltage substantially until a substantially predetermined portion of a buildup on a portion of the first electrode is released into the liquid.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. In an industrial water processing chamber for water contained therein, wherein the chamber comprises the cathode in a cathode-anode electrolytic system, wherein the processing includes placing a DC voltage between the cathode and the anode, wherein the anode and cathode each includes one contact (juncture) thereon for connecting to either a positive or negative output of a source of the DC voltage, and wherein undesired buildup is formed on the cathode due to the electrolytic processing, a method for cathode renewal by removing all or part of the undesired buildup on the cathode, comprising the steps of:
a) attaching a second contact (juncture) to the cathode, wherein the second contact is so placed as to be located a distance away from the first contact;
b) placing an electric voltage between the first and second contacts on the cathode so as to cause an electric current to flow across the cathode;
c) continuing the application of the electric voltage between the first and second contacts on the cathode for so long a time period, as to cause a desired portion of the undesired buildup to detach off the cathode.

2. The method for cathode renewal according to claim 1, wherein the second contact is so located on the cathode as to be substantially on an opposite side of the buildup portion the cathode, with respect to the contact that is functioning during the electrolytic process.

3. The method for cathode renewal according to claim 1, wherein the second contact is at a location distant from the original contact.

4. The method for cathode renewal according to claim 1, wherein a cleaning substance is released into the liquid during the application of the electric voltage for electrode renewal.

5. The method for cathode renewal according to claim 1, wherein during the application of the electric voltage for electrode renewal, the liquid is replaced with brackish water.

6. The method for cathode renewal according to claim 1, wherein during the application of the electric voltage for electrode renewal, the liquid is replaced with sewage.

7. The method for cathode renewal according to claim 1, wherein during the application of the electric voltage for electrode renewal, the liquid is replaced with a petroleum-based liquid.

8. The method for cathode renewal according to claim 1, wherein during the application of the electric voltage for electrode renewal, the liquid is replaced with industrial process water, cooling water or re-circulated water.

9. The method for cathode renewal according to claim 1, wherein the electric voltage for electrode renewal is DC.

10. The method for cathode renewal according to claim 1, wherein the electric voltage for electrode renewal is AC.

11. The method for cathode renewal according to claim 1, wherein the electric voltage for electrode renewal is from the same voltage source used in electrolysis, so that the voltage source is used for either electrolysis by connecting it between the two electrodes, or for electrode renewal by connecting it between the two contacts on the first electrode.

12. The method for cathode renewal according to claim 1, wherein during the application of the electric voltage for electrode renewal, the liquid is removed from the chamber so the first electrode is dry.

13. The method for cathode renewal according to claim 1, wherein during the application of the electric voltage for electrode renewal, the liquid is removed from the chamber and the first electrode is kept damp.

14. The method for cathode renewal according to claim 1, wherein one of the electrodes has a dual use, as an electrode and as the chamber for containing the liquid therein.

* * * * *